US011226040B2

(12) United States Patent
Bill et al.

(10) Patent No.: US 11,226,040 B2
(45) Date of Patent: Jan. 18, 2022

(54) ROTARY SEAL APPARATUS AND ARRANGEMENT OF A ROTARY SEAL APPARATUS IN AN AXLE SUPPORT SYSTEM

(71) Applicant: Deere & Company, Moline, IL (US)

(72) Inventors: Randall K. Bill, Cedar Falls, IA (US); Nathan B. Kukson, Waterloo, IA (US); Scott M. Schipper, Cedar Falls, IA (US); Kyle S. Swanton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 133 days.

(21) Appl. No.: 16/670,566

(22) Filed: Oct. 31, 2019

(65) Prior Publication Data

US 2021/0131562 A1    May 6, 2021

(51) Int. Cl.
*F16J 15/3244* (2016.01)
*F16J 15/3232* (2016.01)

(52) U.S. Cl.
CPC ....... *F16J 15/3244* (2013.01); *F16J 15/3232* (2013.01)

(58) Field of Classification Search
CPC .... F16J 15/00; F16J 15/16; F16J 15/50; F16J 15/52; F16J 15/32; F16J 15/3204; F16J 15/3212; F16J 15/3216; F16J 15/322; F16J 15/324; F16J 15/3244
USPC .......................................................... 277/559
See application file for complete search history.

(56) References Cited

U.S. PATENT DOCUMENTS

| 5,642,946 A * | 7/1997 | Caillault ............... B60C 23/003 384/486 |
| 7,418,989 B2 | 9/2008 | Ingram |
| 9,248,705 B2 * | 2/2016 | Brenninger ............. B60C 23/00 |
| 2015/0231937 A1 * | 8/2015 | Holdrich ................. B60C 29/02 152/417 |

(Continued)

FOREIGN PATENT DOCUMENTS

| DE | 3535855 A1 | 4/1987 |
| DE | 3738529 A1 | 10/1988 |

(Continued)

OTHER PUBLICATIONS

German Search Report issued in counterpart application No. 102020212070.6 dated Mar. 12, 2021 (10 pages).

*Primary Examiner* — Nathan Cumar
(74) *Attorney, Agent, or Firm* — Tucker Ellis LLP

(57) ABSTRACT

Rotary seal systems and apparatus communicate a working fluid between first and second associated machine components that are rotatable relative to each other. A rotary seal apparatus includes annular inner and outer sleeve members for engaging the associated machine components, and a sealing system disposed between the inner and outer sleeve members. The sleeve members each define respective passageways extending through sleeve bodies thereof, and the sealing system forms a fluid chamber between the sleeve bodies defining an annular fluid channel operable to communicate the working fluid between fluid ports of the associated machine components via the passageways of the sleeve members. The rotary seal system may be provided in combination with an axle having a radial passageway opening outside of axially spaced apart first and second bearings carrying the axle.

20 Claims, 9 Drawing Sheets

(56) References Cited

U.S. PATENT DOCUMENTS

2017/0246921 A1\* 8/2017 Hoeldrich ........... B60C 23/0474

FOREIGN PATENT DOCUMENTS

| DE | 69407724 T2 | 8/1998 | | |
|---|---|---|---|---|
| DE | 102017108744 A1 | 10/2018 | | |
| EP | 2655941 B1 | 8/2015 | | |
| WO | 2013056988 A1 | 4/2013 | | |
| WO | WO-2017152996 A1 \* | 9/2017 | ............ | F16C 43/045 |
| WO | WO2017152996 A1 | 9/2017 | | |
| WO | WO2020146097 A1 | 7/2020 | | |

\* cited by examiner

ROTARY SEAL APPARATUS AND ARRANGEMENT OF A ROTARY SEAL APPARATUS IN AN AXLE SUPPORT SYSTEM

FIELD OF THE DISCLOSURE

The embodiments herein relate generally to rotary union devices that provide fluid coupling between associated components that are rotatable relative to each other such as for example between a rotating axle of a vehicle and non-rotating associated components of the vehicle such as an axle housing, and to an arrangement of a rotary seal apparatus in an axle support system. Although the embodiments will be described with reference to rotary union devices that provide a pneumatic coupling between axles and axle housings in work vehicles for supporting central tire inflation systems (CTIS) of the work vehicles, it is to be appreciated that the claimed embodiments are also amenable to other applications and operating conditions, and can be equivalently extended to other devices, systems, and environments such as for example to industrial devices, systems, and environments and to other applications, or anywhere there is a need for a fluid coupling between associated components that are rotatable relative to each other.

BACKGROUND

An integral part of a CTIS is the requirement to transfer air flow in a fluid-tight manner from an air pump on a chassis of the vehicle to the rotating wheel hardware and, ultimately, into the tire volume. This requirement has been met with various levels of modest success using rotary union joints that allow fluid transfer between the non-rotating and rotating members. However, these rotary union joints have typically been expensive and complicated and, because their complicated nature, they have also been sensitive to damage during installation thereby increasing the chance of leaks during use.

Typical rotary union joints include one or more sealing elements which are used to help to prevent leakage of air flow outside of the intended passages, and to help to prevent any foreign debris or fluid from entering into the rotary union. Polytetrafluoroethylene (PTFE) structures have been used as sealing elements for helping to prevent leakage of air flow outside of the intended passages. However, these PTFE structures often include one or more sealing lips that are typically delicate, thus making assembly of the rotary joint difficult without damaging or rolling the lip. In addition, typical rotary union joints include one or more further additional sealing elements for helping to prevent any foreign debris or fluid from entering into the rotary union including for example oil lubricants in applications where the rotary union is placed within a structural housing that is filled with the an oil lubricant. However, the need for providing the further additional sealing elements for protecting the rotary joint from the infusion of debris such as oil adds cost and also complicates the manufacture and installation of the union, and it also adds to the size of the sealing portion tending to make the overall size of the union larger than may be desirable for certain applications.

In addition to the above, rotary unions that are used as interfaces between axles and axle housings are often placed between axle bearing pairs as a matter of functional priority so that areas outside of the axle bearing pairs may be reserved for other higher priority functions of the work vehicle, and also as a matter of design convenience wherein the area between the axle bearing pairs offers designers an area of the work vehicle that isn't otherwise already committed to providing support for the other higher priority functions of the work vehicle. Rotary unions have also been placed outboard of the axle bearing pairs between the axle housing and the hub supporting the vehicle wheel so that the rotary union may be easily accessible for installation, servicing, or the like. In these various positions, passageways in the rotary union are able to communicate via the rotary union with corresponding passageways defined in the axles and housings for supplying air from the work vehicle to the tires that may be moving while the vehicle is operated. However, there is typically a fair amount of component stress on the axle in the area between the bearing at the axle housing and the hub supporting the vehicle wheel owing to torsional and/or bending loads. Accordingly, the manufacture of fluid transfer passages into axle shafts to accommodate the placement of rotary unions between axle bearing pairs or the placement of rotary unions outboard of the bearing pairs between the axle housing and the hub supporting the vehicle wheel may lead to a further increase of component stress on the axle under the torsional and bending loads. Placement selection of the rotary union in an axle arrangement can therefore significantly impact the axle shaft design for fatigue life.

Given the above, therefore, it is desirable to provide a rotary seal apparatus that is inexpensive and easy to manufacture.

It would further be desirable to provide a rotary seal apparatus that is not easily damaged during installation and that can be made up as a component level air sealing package such as for example as a cartridge so that the rotary seal apparatus may be fully tested for fit and function by skilled technicians under controlled conditions during manufacture and before it is sent to an end user or repair personnel for field installation at the work vehicle. Such a rotary seal could be made up as a cartridge or completed device for delivery to the end user as a pre-tested unitary integration of subcomponents as a unitized device that requires no further assembly during installation into a work vehicle in the field.

It would further be desirable to provide an arrangement of a rotary seal apparatus in an axle support system that locates the rotary union at a position inboard of the primary axle shaft supports thereby enabling axle shaft air passage features to be located outside of any areas of higher stress flow that may be generated from ground engaging bending loads of the axle during use of the associated work vehicle.

SUMMARY

The embodiments herein provide for new and improved rotary seal apparatus and systems for providing fluid coupling between associated components that are rotatable relative to each other.

The embodiments herein further provide a rotary seal apparatus that is inexpensive and easy to manufacture.

The embodiments herein further provide a rotary seal apparatus that includes a sealing system that both prevents the leakage of air flow outside of the intended passages, and also prevents debris such as oil or the like from flowing into the air flow passages.

The embodiments herein further provide a rotary seal apparatus that can be made up as a component level air sealing package such as for example as a cartridge so that the rotary seal apparatus may be tested for fit and function by skilled technicians under controlled conditions before it is sent to an end user or repair personnel for field installation at the work vehicle.

The embodiments herein further provide an arrangement of a rotary seal apparatus in an axle support system that locates the rotary union at a position inboard of the primary axle shaft supports thereby enabling axle shaft air passage features to be located outside the stress flow generated from ground engaging bending loads of the axle during use of the associated work vehicle.

In accordance an aspect, a rotary seal apparatus is provided for communicating a working fluid between first and second associated machine components that are rotatable relative to each other about a rotation axis extending through the first and second associated machine components, wherein the first associated machine component is located in or within the second associated machine component. The rotary seal apparatus includes an annular inner sleeve member having an inner sleeve body having opposite radially outwardly directed and radially inwardly directed engagement surfaces, an annular outer sleeve member having an outer sleeve body having opposite radially outwardly directed and radially inwardly directed engagement surfaces, and a sealing system disposed between the inner and outer sleeve members. In this aspect, the radially inwardly directed engagement surface of the inner sleeve body is configured for selective engagement with the first associated machine component located within the second associated machine component, wherein the inner sleeve member defines a first passageway extending through the inner sleeve body between the opposite radially outwardly and radially inwardly directed engagement surfaces of the inner sleeve body, and wherein the first passageway is in operative fluid communication with a first fluid port of the first associated machine component when the radially inwardly directed engagement surface of the inner sleeve body is selectively engaged with the first associated machine component. Further in this aspect, the radially outwardly directed engagement surface of the outer sleeve body is configured for selective engagement with the second associated machine component located outside of the first associated machine component, wherein the outer sleeve member defines a second passageway extending through the outer sleeve body between the opposite radially outwardly and radially inwardly directed engagement surfaces of the outer sleeve body, and wherein the second passageway is in operative fluid communication with a second fluid port of the second associated machine component when the radially outwardly directed engagement surface of the outer sleeve body is selectively engaged with the second associated machine component. Still further in this aspect, the sealing system disposed between the inner and outer sleeve members includes an attachment portion attached with a one of the inner sleeve body or the outer sleeve body, and an engagement portion slidably engaged with the other of the inner sleeve body or the outer sleeve body, wherein the sealing system forms a fluid chamber between the inner and the outer sleeve bodies, and wherein the fluid chamber defines an annular fluid channel between the inner and the outer sleeve bodies, the annular fluid channel being operable to communicate the working fluid between the first fluid port of the first associated machine component via the first passageway of the inner sleeve member and the second fluid port of the second associated machine component via the second passageway of the outer sleeve member.

In accordance with a further aspect, a system is provided for communicating a working fluid between components of an associated work vehicle, wherein the system includes a housing member, an elongate axle carried for rotation about a rotation axis relative to the housing member of the associated work vehicle on axially spaced apart first and second bearings of the associated work vehicle, and a rotary seal apparatus for communicating the working fluid between the axle and the associated housing member of the associated work vehicle, wherein the elongate axle includes an axle body defining an axial passageway extending within the axle body along a first portion of the axle between the axially spaced apart first and second bearings in a first direction substantially in parallel with the rotation axis, and a radial passageway extending within the axle body outside of the first portion of the axle between the axially spaced apart first and second bearings in a second direction substantially perpendicular to the rotation axis. The axial and radial passageways are in fluid communication with each other. The axial passageway defines an outer port opening outside of the housing member, and the radial passageway includes an inner port opening inside of the housing member.

Other embodiments, features and advantages of the example embodiments of rotary seal apparatus and systems for providing fluid coupling between associated components that are rotatable relative to each other, and of rotary seal apparatus in axle support systems that locate the rotary union at a position inboard of the primary axle shaft supports, will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, example embodiments of the claimed invention are illustrated, which, together with a general description of the embodiments given above, and the detailed description given below, serve to exemplify the example embodiments of the claimed invention.

DETAILED DESCRIPTION

In the following description of the example embodiments reference is made to the accompanying Figures which form a part thereof, and in which is shown, by way of illustration, example embodiments illustrating various principles of the claimed invention and how it may be practiced. Other embodiments can be utilized to practice the claimed invention and structural and functional changes can be made thereto without departing from the spirit and scope of the descriptions herein.

Figure 1:
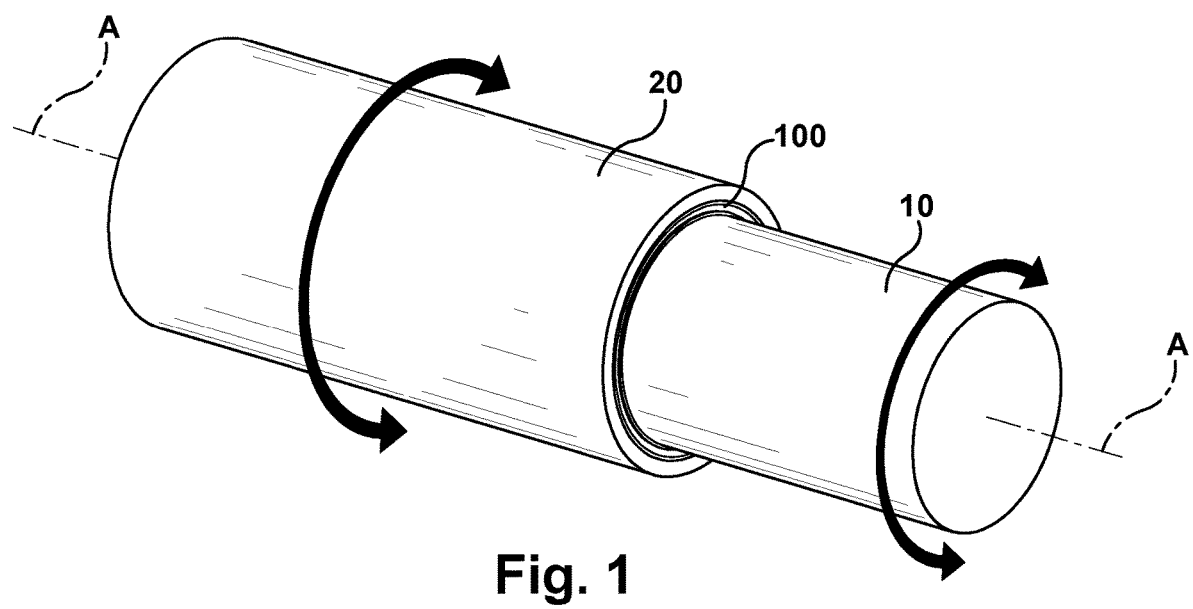
FIG. 1 is a schematic depiction of operation of a rotary seal apparatus in accordance with the embodiments disposed between first and second associated machine components.

Referring now to the drawings, wherein the showings are only for the purpose of illustrating the example embodiments of a rotary seal apparatus and of a rotary seal apparatus in a system for communicating a working fluid between an axle and an axle housing of an associated work vehicle, and not for purposes of limiting the same, FIG. 1 is a schematic depiction of operation of a rotary seal apparatus 100 in accordance with the example embodiments disposed between first and second associated machine components 10, 20. As shown, the first and second associated machine components 10, 20 are rotatable relative to each other about a rotation axis A extending through the first and second associated machine components 10, 20. Further as shown, the first associated machine component 10 is located in or within the second associated machine component 20. The first associated machine component 10 may include one or more first fluid passageways (not shown) in fluid communication with various structures of the rotary seal apparatus 100 to be described in greater detail below and, similarly, the second associated machine component 20 may include one or more second fluid passageways (not shown) in fluid communication with various further structures of the rotary seal apparatus 100 to be described in greater detail below. In that way, the rotary seal apparatus 100 of the example embodiments is operative to place the one or more first fluid passageways of the first associated machine component 10 in operative fluid communication with the one or more second fluid passageways of the second associated machine component 20, while enabling relative rotation between the first and second machine components without leakage of the fluid outside of the rotary seal apparatus 100, and also prevents debris such as oil or the like from flowing into the rotary seal apparatus 100.

In accordance with the example embodiments, the rotary seal apparatus 100 provides fluid coupling between associated components that are rotatable relative to each other such as for example between a rotating axle of a work vehicle and related non-rotating associated components of the work vehicle such as for example an axle housing. The rotary seal apparatus 100 of the example embodiments may provide, for example, a pneumatic coupling between axles and axle housings in work vehicles for supporting CTIS of the work vehicles. In this regard, it is to be appreciated that the first associated machine component 10 may be for example a rotating axle carrying a tire of the work vehicle and the second associated machine component 20 may be for example a non-rotating axle housing of the work vehicle wherein the rotary seal apparatus 100 of the example embodiment may communicate pressurized air from the non-rotating axle housing of the work vehicle to the axle that rotates together with the tire of the work vehicle for further communication via passageways of the axle to the tire of the work vehicle during use of the work vehicle.

It is further to be appreciated that the first associated machine component 10 may also be, for example, a non-rotating spindle or steering knuckle of the work vehicle and the second associated machine component 20 may be, for example, a rotating wheel hub carrying a tire of the work vehicle, wherein the rotary seal apparatus 100 of the example embodiment may communicate pressurized air from the non-rotating spindle or steering knuckle of the work vehicle to the wheel hub that rotates together with the tire of the work vehicle for further communication via passageways of the wheel hub to the tire of the work vehicle.

Figure 2:
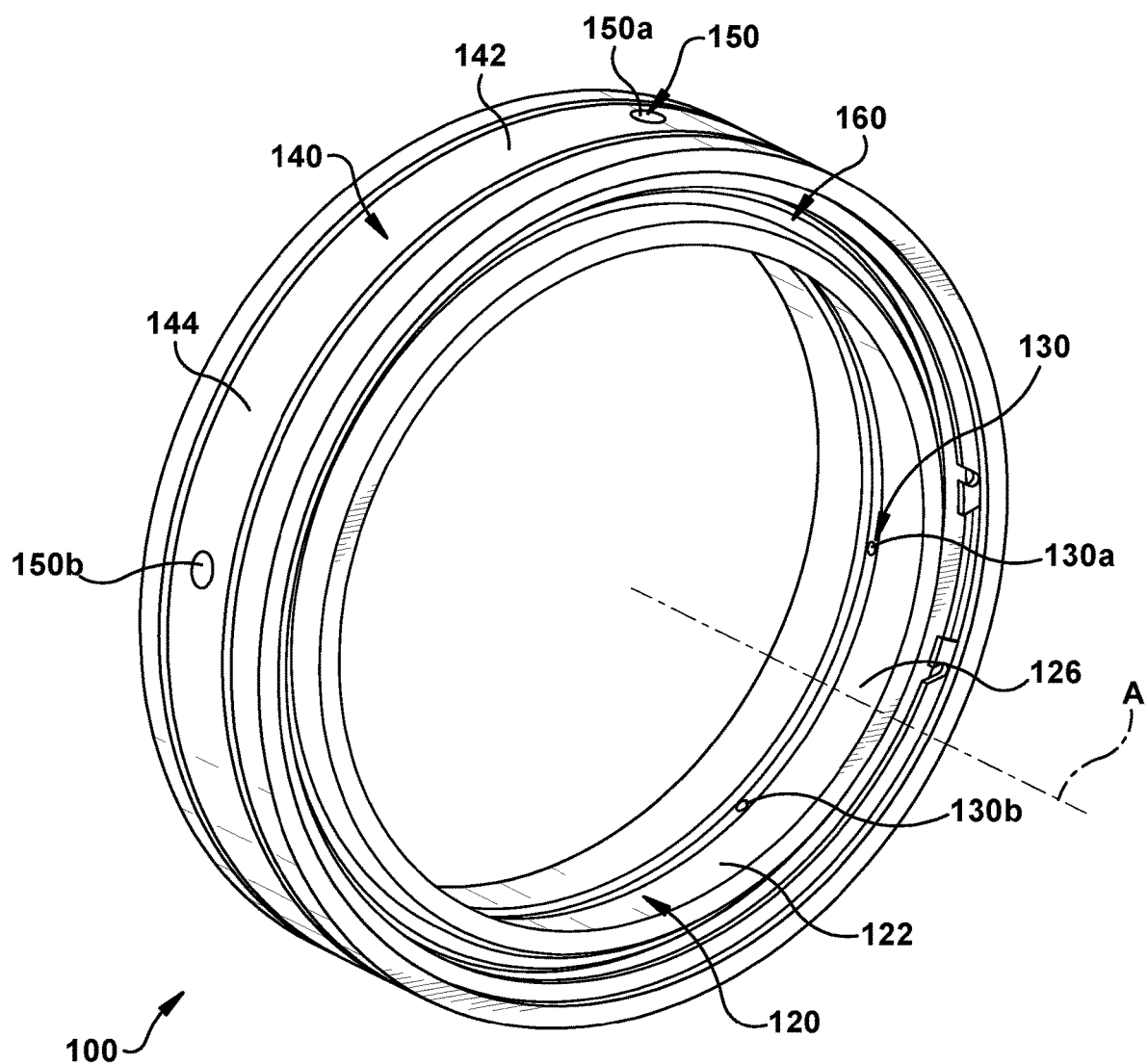
FIG. 2 is a perspective view of the rotary seal apparatus of FIG. 1 shown removed from being disposed between the first and second associated machine components.

FIG. 2 is a perspective view of the rotary seal apparatus 100 shown in FIG. 1 shown removed from being disposed between the first and second associated machine components 10, 20. In the conformation shown in FIG. 2, a rotary seal apparatus 100 is provided that is inexpensive and easy to manufacture. The rotary seal apparatus 100 of the example embodiment includes a sealing system that both prevents the leakage of air flow outside of the intended passages, and also prevents debris such as oil or the like from flowing into the air flow passages. The rotary seal apparatus 100 of the example embodiment can be made up as a component level air sealing package such as for example as a cartridge so that the rotary seal apparatus may be tested for fit and function by skilled technicians under controlled conditions before it is sent to an end user or repair personnel for field installation at the work vehicle.

The rotary seal apparatus 100 of the example embodiment shown in FIG. 2 includes an annular inner sleeve member 120 defining an inner sleeve body 122, an annular outer sleeve member 140 defining an outer sleeve body 142, and a sealing system 160 disposed between the inner and outer sleeve members 120, 140. A radially inwardly directed engagement surface 126 of the inner sleeve body 122 is configured for selective engagement with the first associated machine component 10 (FIG. 1) and defines a first passageway 130 extending through the inner sleeve body 122 between the opposite radially outwardly (not shown) and radially inwardly directed engagement surfaces 124, 126 of the inner sleeve body 122. In the example embodiment illustrated, the first passageway 130 includes one or more circumferentially spaced apart holes 130a, 130b that extend through the inner sleeve body 122. In the example, the inner sleeve body 122 is provided with eight (8) holes (only two (2) are visible in the drawing Figure) that are circumferentially spaced apart by about 45° in a plane perpendicular to the rotation axis A. However, any number of holes and any form of one or more apertures may be used in any arrangement as may be necessary or desired for the first passageway 130 in the example embodiments. The one or more holes of the first passageway 130 that extend through the inner sleeve body 122 are, during use of the rotary seal apparatus 100, in operative fluid communication with a first fluid port (not shown) of the first associated machine component 10 when the radially inwardly directed engagement surface 126 of the inner sleeve body 122 is selectively engaged with a corresponding radially outwardly directed engagement surface of the first associated machine component 10 such as by coupling or otherwise press-fitting the inner sleeve body 122 onto the first associated machine component 10 for frictionally securing the inner sleeve body 122 with the first associated machine component.

Similarly, a radially outwardly directed engagement surface 144 of the outer sleeve body 142 is configured for selective engagement with a corresponding radially inwardly directed engagement surface of the second associated machine component 20 (FIG. 1) and defines a second passageway 150 extending through the outer sleeve body 142 between the opposite radially outwardly and radially inwardly (not shown) directed engagement surfaces 144, 146 of the outer sleeve body 142. In the example embodiment illustrated, the second passageway 150 includes one or more circumferentially spaced apart holes 150a, 150b that extend through the outer sleeve body 142. In the example the outer sleeve body 142 is provided with four (4) holes (only two (2) are visible in the drawing Figure) that are circumferentially spaced apart by about 90° in a plane perpendicular to the rotation axis A. However, any number of holes and any form of one or more apertures may be used in any arrangement as may be necessary or desired for the second passageway 150 in the example embodiments. The one or more holes of the second passageway 150 that extend through the outer sleeve body 142 are, during use of the rotary seal apparatus 100, in operative fluid communication with a second fluid port (not shown) of the second associated machine component 20 when the radially outwardly directed engagement surface 146 of the outer sleeve body 142 is selectively engaged with the second associated machine component 20 such as by coupling or otherwise press-fitting the outer sleeve body 142 into the second associated machine component 20 for frictionally securing the outer sleeve body 142 with the second associated machine component.

As described in general above, the rotary seal apparatus 100 of the various example embodiments are provided for communicating a working fluid between first and second associated machine components 10, 20 that are rotatable relative to each other about a rotation axis A extending through the first and second associated machine components. The rotary seal apparatus 100 includes, in general, annular inner and outer sleeve members 120, 140, and a sealing system 160 disposed between the inner and outer sleeve members. A radially inwardly directed engagement surface 126 of the inner sleeve body 122 of the inner sleeve member 120 is configured for selective engagement with a corresponding radially outwardly directed engagement surface of the first associated machine component 10 for the inner sleeve member 120 to be carried by and move with the first associated machine component 10 and, correspondingly, a radially outwardly directed engagement surface 144 of the outer sleeve body 142 of the outer sleeve member 140 is configured for selective engagement with a corresponding radially inwardly directed engagement surface of the second associated machine component 20 for the outer sleeve member 140 to be carried by and move with the second associated machine component 20. In this regard, however, it is to be appreciated and understood that the sealing system 160 disposed between the inner and outer sleeve members 120, 140 may equivalently be coupled with either of the inner or outer sleeve members 120 or 140 and slidable on the other of the inner and outer sleeve members. That is, the sealing system 160 may be coupled with the inner sleeve member 120 and slidable on the outer sleeve member 140 or, equivalently, the sealing system 160 may be coupled with the outer sleeve member 140 and slidable on the inner member 120.

Figure 3:
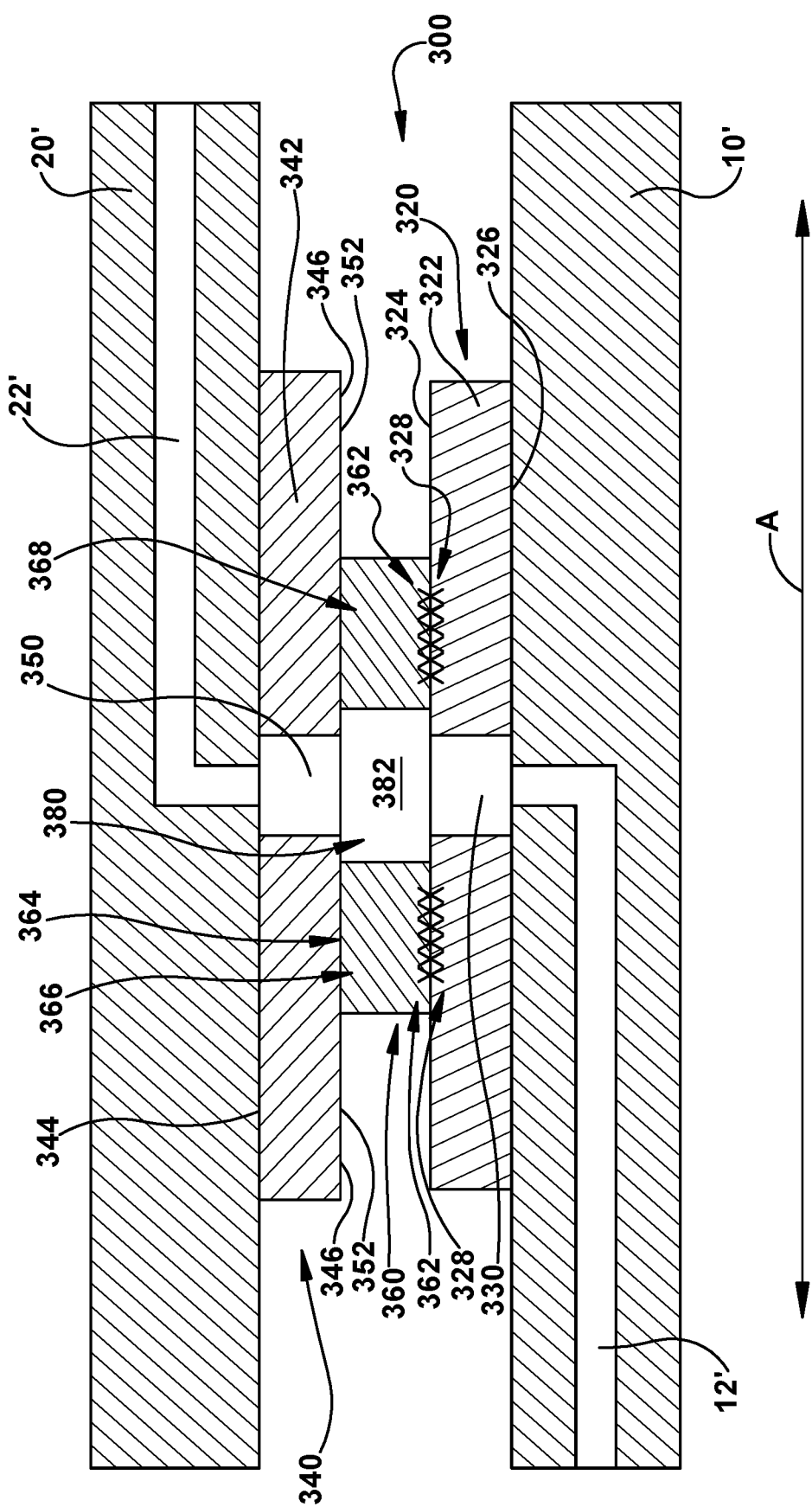
FIG. 3 is a cross-sectional view of a rotary seal apparatus in accordance with an example embodiment disposed between the first and second associated machine components of FIG. 1, and having a sealing member carried by an inner sleeve member of the rotary seal apparatus.
Figure 4:
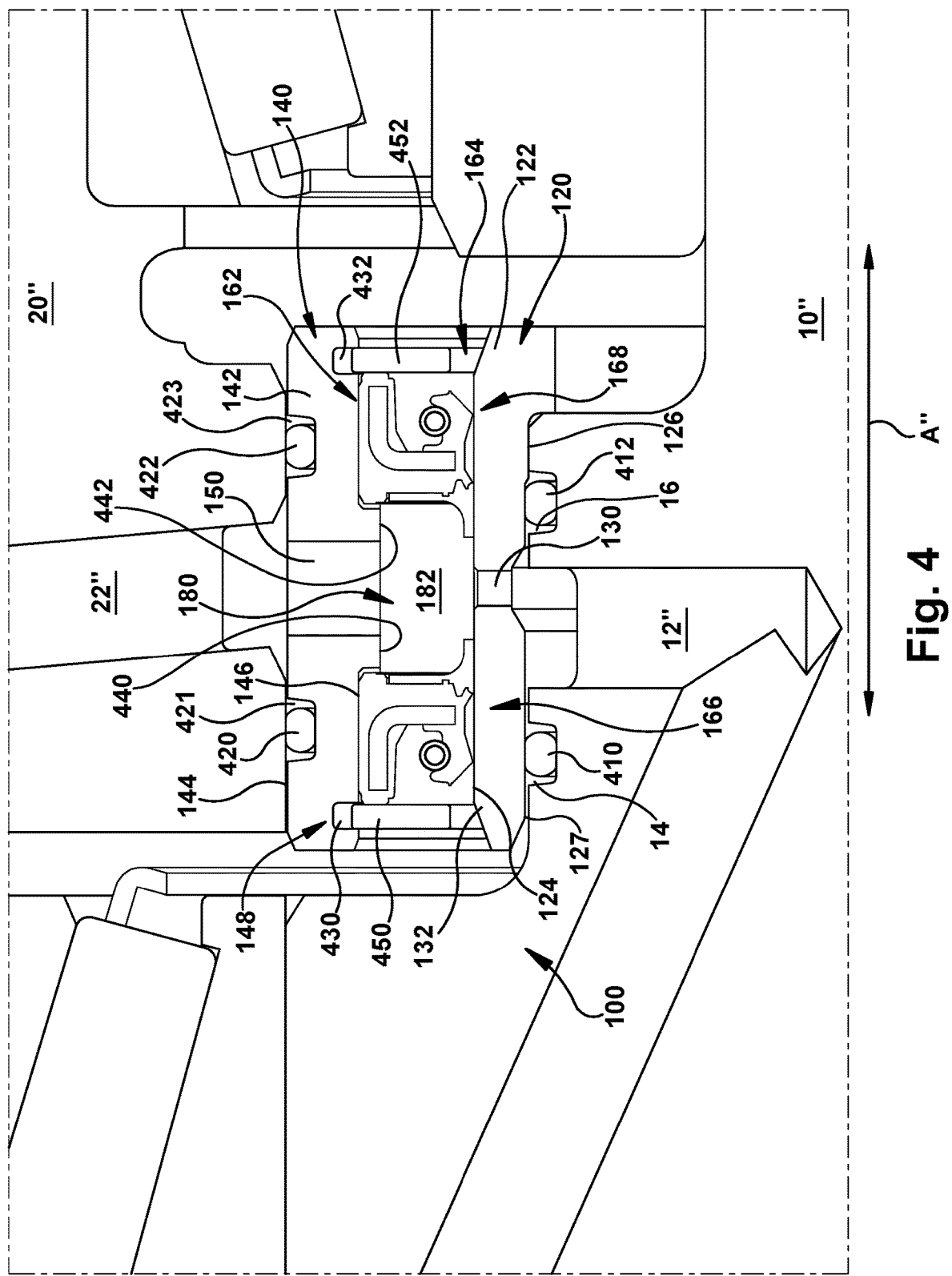
FIG. 4 is a cross-sectional view of a rotary seal apparatus in accordance with an example embodiment disposed between first and second associated machine components of an associated work vehicle, and having a sealing member carried by an outer sleeve member of the rotary seal apparatus.

With the above in mind, FIGS. 3 and 4, show alternative equivalent example embodiments of rotary seal apparatuses 300, 100, wherein FIG. 3 shows an example embodiment of a rotary seal apparatus 300 in cross-sectional view having a sealing system 360 attached with an inner sleeve body 322 of an inner sleeve member 320 and slidable relative to an outer sleeve body 342 of an outer sleeve member 340, and FIG. 4 shows an example embodiment of a rotary seal apparatus 100 in cross-sectional view having a sealing system 160 attached with the outer sleeve body 142 of the outer sleeve member 140 and slidable relative to the inner sleeve body 122 of the inner sleeve member 120.

Turing first to FIG. 3, a rotary seal apparatus 300 is provided in accordance with a further example embodiment for communicating a working fluid between first and second associated machine components 10', 20' that are rotatable relative to each other about a rotation axis A' extending through the first and second associated machine components 10', 20', wherein the first associated machine component 10' is located in the second associated machine component 20'. The rotary seal apparatus 300 of the example embodiment includes annular inner and outer sleeve members 320, 340, and a sealing system 360 disposed between the inner and outer sleeve members 320, 340. The annular inner sleeve member 320 of the illustrated example includes an inner sleeve body 322 having opposite radially outwardly directed and radially inwardly directed engagement surfaces 324, 326. The radially inwardly directed engagement surface 326 of the inner sleeve body 322 is configured for selective engagement with the first associated machine component 10' such as by coupling or otherwise press-fitting the inner sleeve body 322 onto the first associated machine component 10' for frictionally securing the inner sleeve body 322 with the first associated machine component. The inner sleeve body 322 defines a first passageway 330 extending through the inner sleeve body 322 between the opposite radially outwardly and radially inwardly directed engagement surfaces 324, 326 of the inner sleeve body 322. It is to be appreciated that any number of holes and any form of one or more apertures may be used in any arrangement as may be necessary or desired for the first passageway 330 of the example embodiment illustrated. During use of the rotary seal apparatus 300, the first passageway 330 is in operative fluid communication with a first fluid port 12' of the first associated machine component 10' when the radially inwardly directed engagement surface 326 of the inner sleeve body 322 is selectively engaged with the first associated machine component 10'.

In addition to the above, the annular outer sleeve member 340 includes an outer sleeve body 342 having opposite radially outwardly directed and radially inwardly directed engagement surfaces 344, 346. The radially outwardly directed engagement surface 344 of the outer sleeve body 342 is configured for selective engagement with the second associated machine component 20' such as by coupling or otherwise press-fitting the outer sleeve body 342 into the second associated machine component 20' for frictionally securing the outer sleeve body 342 with the second associated machine component. The outer sleeve body 342 defines a second passageway 350 extending through the outer sleeve body 342 between the opposite radially outwardly and radially inwardly directed engagement surfaces 344, 346 of the outer sleeve body 342. It is to be appreciated that any number of holes and any form of one or more apertures may be used in any arrangement as may be necessary or desired for the second passageway 350 of the example embodiment illustrated. During use of the rotary seal apparatus 300 of the illustrated embodiment, the second passageway 350 is in operative fluid communication with a second fluid port 22' of the second associated machine component 20' when the radially outwardly directed engagement surface 344 of the outer sleeve body 342 is selectively engaged with the second associated machine component 20'.

In further addition to the above and with continued reference to FIG. 3, the sealing system 360 of the example embodiment shown includes an attachment portion 362 attached with the inner sleeve body 322, and an engagement portion 364 slidably engaged with the outer sleeve body 342. The sealing system 360 when disposed between the inner and the outer sleeve members 320, 340 in the position shown forms a fluid chamber 380 between the inner and the outer sleeve bodies 322, 342. As shown, the fluid chamber 380 defines an annular fluid channel 382 operable to communicate the working fluid between the first fluid port 12' of the first associated machine component 10' via the first passageway 330 of the inner sleeve member 320 and the second fluid port 22' of the second associated machine component 20' via the second passageway 350 of the outer sleeve member 340.

With further continued reference to FIG. 3, the inner sleeve body 322 of the inner sleeve member 320 defines an attachment portion 328. The attachment portion 362 of the sealing system 360 is attached with the attachment portion 328 of the inner sleeve body 322 for movement of the sealing system 360 together with the inner sleeve body 322 and also therefore together with the first associated machine component 10'. In addition, the radially inwardly directed engagement surface 346 of the outer sleeve body 342 includes a radially inwardly directed wear surface 352 configured to slidably engage the engagement portion 364 of the sealing member 360 when the first and second associated machine components 10', 20' are rotated relative to each other about the rotation axis A' extending through the first and second associated machine components 10', 20'.

In addition and as shown, the engagement portion 364 of the sealing system 360 is formed in the example embodiment by axially spaced apart first and second sealing member portions 366, 368. The axially spaced apart first and second sealing member portions 366, 368 are provided and arranged to define the fluid chamber 380 of the sealing system 360 therebetween. As illustrated, the first and second sealing member portions 366, 368 of the sealing system 360 are disposed on opposite sides of the second passageway 350 defined by the outer sleeve body 342 of the outer sleeve member 340. For accommodating the conformation of the engagement portion 364 of the sealing system 360 as shown, the radially inwardly directed engagement surface 346 of the outer sleeve body 342 defines a radially inwardly directed wear surface 352 that is configured to slidably engage the first and second sealing member portions 366, 368 when the first and second associated machine components 10', 20' are rotated relative to each other about the rotation axis A' extending through the first and second associated machine components 10', 20'.

FIG. 4 is a cross-sectional view of the rotary seal apparatus 100 of FIGS. 1 and 2 in accordance with an example embodiment having a sealing member 160 carried by an outer sleeve member 140 of the rotary seal apparatus 100, and disposed between particular first and second associated machine components 10", 20" of an associated work vehicle (not shown). With reference now to that figure, the rotary seal apparatus 100 of the example embodiment illustrated is provided for communicating a working fluid such as air for example between first and second associated machine components 10", 20" that are rotatable relative to each other about a rotation axis A" extending through the first and second associated machine components 10", 20", wherein the first associated machine component 10" is located in or within the second associated machine component 20". In the example embodiment, the first associated machine component 10" may be, for example, a spindle of a work vehicle such as farm tractor spindle. In addition in the example embodiment, the second associated machine component 20" may be, for example, a driven hub of the work vehicle that may for example be attached with a wheel and tire for delivering fluid such as air from the work vehicle to the tire through the spindle and driven hub via the subject rotary seal apparatus 100.

The rotary seal apparatus 100 of the example embodiment includes an annular inner sleeve member 120 comprising an inner sleeve body 122 having opposite radially outwardly directed and radially inwardly directed engagement surfaces 124, 126, an annular outer sleeve member 140 comprising an outer sleeve body 142 having opposite radially outwardly directed and radially inwardly directed engagement surfaces 144, 146, and a sealing system 160 disposed between the inner and outer sleeve members 120, 140. The inner sleeve body 122 further defines a radially inwardly directed guide surface 127 having a slightly larger diameter than the diameter defined by the radially inwardly directed engagement surface 126. The radially inwardly directed engagement surface 126 of the inner sleeve body 122 may define a first diameter, and the inner sleeve body 122 may define a radially inwardly directed guide surface 127 having a second diameter, wherein the second diameter is larger than the first diameter. In that way, the radially inwardly directed guide surface 127 may help to guide the rotary seal apparatus 100 into the space between the associated first and second machine components 10", 20" until the rotary seal apparatus 100 is nearly fully inserted into place between the first and second machine components 10", 20" during installation of the rotary seal apparatus 100, at which position the radially inwardly directed engagement surface 126 may make contact with a corresponding surface on the associated first machine component 10" for establishing the press fit for frictional attachment of the an inner sleeve body 122 onto the associated first machine component 10". The radially inwardly directed engagement surface 126 of the inner sleeve body 122 is configured for selective engagement with the first associated machine component 10" such as by coupling or otherwise press-fitting the inner sleeve body 122 onto the first associated machine component 10" for frictionally securing the inner sleeve body 122 with the first associated machine component. The inner sleeve member 120 defines a first passageway 130 extending through the inner sleeve body 122 between the opposite radially outwardly and radially inwardly directed engagement surfaces 124, 126 of the inner sleeve body 122. The first passageway 130 is in operative fluid communication with a first fluid port 12" of the first associated machine component 10" when the radially inwardly directed engagement surface 126 of the inner sleeve body 122 is selectively engaged with the first associated machine component 10". In the example embodiment illustrated, the first associated machine component 10" defines a pair of circular grooves 14, 16 disposed on opposite sides of the first passageway 130 for receiving a corresponding pair of seal members 410, 412. In their preferred form, the pair of seal members 410, 412 comprise O-rings disposed in the pair of circular grooves 14, 16 for providing a fluid tight seal between the inner sleeve member 120 and the first associated machine component 10" so that fluid such as air or the like may be communicated between the first fluid port 12" of the first associated machine component 10" and the first passageway 130 of the inner sleeve body 122 without leakage thereof.

In addition, the radially outwardly directed engagement surface 144 of the outer sleeve body 142 is configured for selective engagement with the second associated machine component 20 such as by coupling or otherwise press-fitting the outer sleeve body 142 into the second associated machine component 20". The outer sleeve member 140 defines a second passageway 150 extending through the outer sleeve body 142 between the opposite radially outwardly and radially inwardly directed engagement surfaces 144, 146 of the outer sleeve body 142. The second passageway 150 is in operative fluid communication with a second fluid port 22" of the second associated machine component 20" when the radially outwardly directed engagement surface 144 of the outer sleeve body 142 is selectively engaged with the second associated machine component 20. In the example embodiment illustrated, the outer sleeve body 142 defines a pair of circular grooves 421, 423 disposed on opposite sides of the second passageway 150 for receiving a corresponding pair of seal members 420, 422. In their preferred form, the pair of seal members 420, 422 comprise O-rings disposed in the pair of circular grooves 421, 423 for providing a fluid tight seal between the outer sleeve member 140 and the second associated machine component 20" so that fluid such as air or the like may be communicated between the second fluid port 22" of the second associated machine component 20" and the second passageway 150 of the outer sleeve body 142 without leakage thereof.

In further addition to the rotary seal apparatus 100 of the example embodiment shown in cross-sectional view in FIG. 4, the sealing system 160 includes an attachment portion 162 attached with the outer sleeve body 142, and an engagement portion 164 slidably engaged with the inner sleeve body 122. In the position shown with the sealing system 160 disposed between the inner and the outer sleeve members 120, 140, a fluid chamber 180 is defined or otherwise formed between the inner and the outer sleeve bodies 122, 142. The fluid chamber 180 defines an annular fluid channel 182 operable to communicate the working fluid between the first fluid port 12" of the first associated machine component 10" via the first passageway 130 of the inner sleeve member 120 and the second fluid port 22" of the second associated machine component 20" via the second passageway 150 of the outer sleeve member 140.

As shown, the outer sleeve body 142 of the outer sleeve member 140 of the example embodiment includes an attachment portion 148 to be described in greater detail below. The attachment portion 162 of the sealing system 160 is attached with the attachment portion 148 of the outer sleeve body 142 for movement of the sealing system 160 and the outer sleeve body 142 together with the second associated machine component 20. In addition and as shown, the engagement portion of the sealing system 164 includes first and second sealing member portions 166, 168 that define the fluid chamber 180 of the sealing system 160 therebetween. The first and second sealing member portions 166, 168 of the sealing system 160 are disposed on opposite sides of the first passageway 130 defined by the inner sleeve body 122 of the inner sleeve member 120. In that way, the working fluid may pass through the inner sleeve member 120 and into the fluid chamber 180 unencumbered. The radially outwardly directed engagement surface 124 of the inner sleeve body 122 includes in the example embodiment a radially outwardly directed wear surface 132 configured to slidably engage the first and second sealing members 166, 168 when the first and second associated machine components 10, 20 are rotatable relative to each other about the rotation axis A extending through the first and second associated machine components 10, 20.

As noted above, the attachment portion 162 of the sealing system 160 is attached with the attachment portion 148 of the outer sleeve body 142 for movement of the sealing system 160 and the outer sleeve body 142 together with the second associated machine component 20. The attachment portion 148 of the outer sleeve body 142 in accordance with the example embodiment includes first and second grooves 430, 432, and first and second abutment surfaces 440, 442 defined by the radially inwardly directed engagement surface 146 of the outer sleeve body 420. The first and second grooves 430, 432 are axially spaced apart and are provided on opposite sides of the second passageway 150 for carrying first and second fasteners 450, 452, respectively. In their preferred form, the first and second fasteners 450, 452 may be snap ring fasteners, or the like. In its assembled form, attachment portion 162 of the sealing system 160 is held in place between the first and second abutment surfaces 440, 442 and the first and second fasteners 450, 452 carried in the first and second grooves 430, 432. In that way, the sealing member 160 maybe carried by the outer sleeve member 140 of the rotary seal apparatus 100.

Figure 5A:
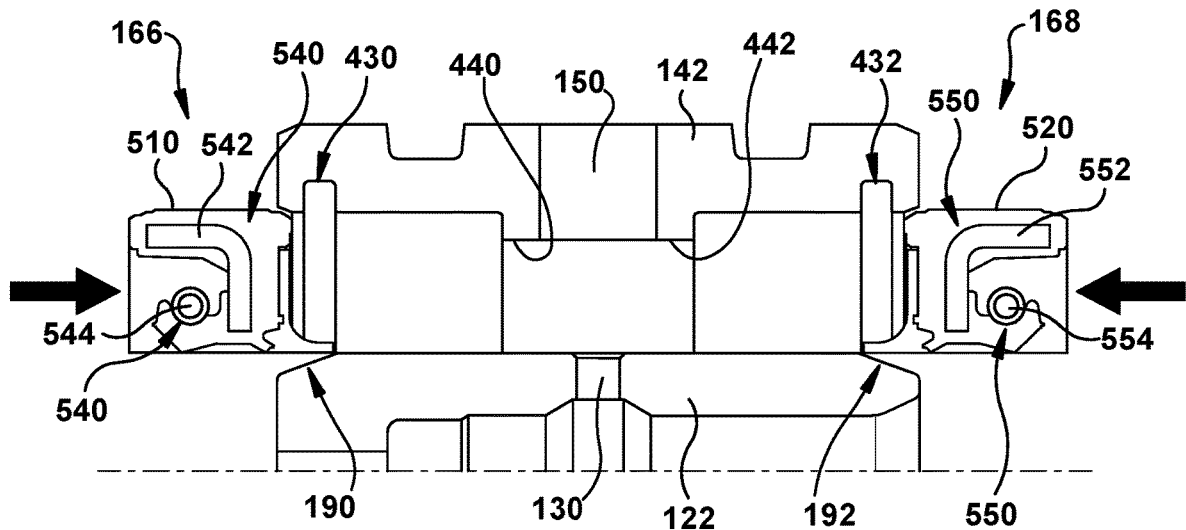
FIGS. 5a and 5b show components of the rotary seal apparatus of FIGS. 1 and 2 as it is assembled in accordance with an example embodiment.
Figure 5B:
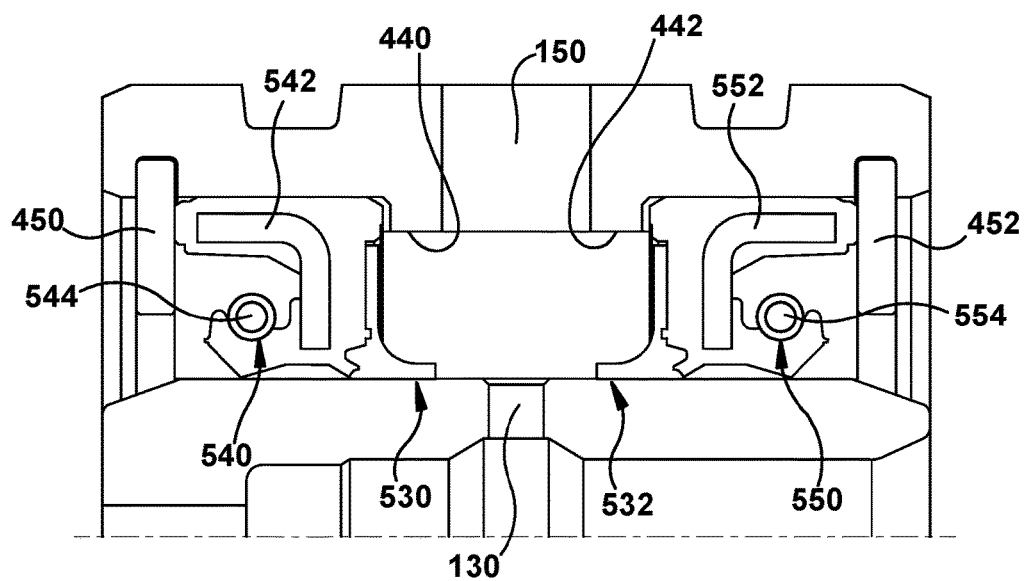

FIGS. 5a and 5b show components of the rotary seal apparatus of FIGS. 1 and 2 as it is assembled in sequence in accordance with an example embodiment. As described above, the engagement portion 164 of the sealing system 160 includes first and second sealing member portions 166, 168 that define in the fully assembled rotary seal apparatus 100 of the example embodiment a fluid chamber 180 of the sealing system 160 therebetween. The first and second sealing member portions 166, 168 of the sealing system 160 are disposed on opposite sides of the first passageway 130 defined by the inner sleeve body 122 of the inner sleeve member 120. It is to be appreciated, however, that the first and second sealing member portions 166, 168 of the engagement portion 164 of the sealing system 160 may be formed as a single integrated body or member having one or more holes and/or passageways (not shown) provided for allowing fluid to pass through the sealing system 160 and the passageways 130, 150. It is to further be appreciated that the first and second sealing member portions 166, 168 of the sealing system 160 may be provided as separate two (2) or more sealing system body members 510, 520 as shown for example in FIGS. 5a and 5b.

First during assembly of the rotary seal apparatus 100 of the example embodiment, each of the inner and outer sleeve bodies 122, 142 are held in a fixed relative relationship as shown in FIGS. 5a and 5b such as by using a rigid fixture or the like with the inner sleeve body 122 located or otherwise disposed within the outer sleeve body 142. FIG. 5a shows the inner and outer sleeve bodies 122, 142 held in the fixed relative relationship in preparation for insertion of the first and second sealing system body members 510, 520 therebetween. As shown, the inner sleeve body 122 is symmetrical thereby making assembly easier whereby in the inner sleeve body 122 may be inserted into the rigid fixture or the like in either the orientation shown in FIG. 5a, or in the reverse orientation such as with the second groove 432 arranged to the left as shown in the drawing Figure, and with the first groove 430 arranged to the right as shown in the drawing Figure. In accordance with the example embodiment, the inner sleeve body 122 is symmetrical about the second passage 150 and, in particular, about a centerline of the second passage 150.

Next during assembly of the rotary seal apparatus 100 of the example embodiment, the first and second sealing system body members 510, 520 are inserted into the space between the inner and outer sleeve bodies 122, 142 held in the fixed relative relationship. In the example embodiment, the first sealing system body member 510 carries the first sealing member portion 166 comprising a first sealing lip member 530 extending in a first direction along the rotation axis towards the first passageway 130 defined by the inner sleeve body of the inner sleeve member. The first sealing lip member 530 is configured to slidably engage the radially outwardly directed wear surface 132 of the inner sleeve body 122 on a first side of the first passageway 130 defined by the inner sleeve body of the inner sleeve member under an influence of a pressure of the fluid within the annular fluid channel. Similarly, the second sealing system body member 520 carries the second sealing member portion 168 comprising a second sealing lip member 532 extending in a second direction opposite the first direction along the rotation axis towards the first passageway 130 defined by the inner sleeve body of the inner sleeve member. The second sealing lip member 532 is configured to slidably engage the radially outwardly directed wear surface of the inner sleeve body on a second side of the first passageway defined by the inner sleeve body of the inner sleeve member under the influence of the pressure of the fluid within the annular fluid channel.

In the example embodiment illustrated, ends of the inner sleeve member 120 are provided with chamfer or bevel portions 190, 192 for engaging the pair of first and second sealing lip members 530, 532 in the position of the components as shown in FIG. 5a. This helps to ensure that the first and second sealing system body members 510, 520 and, in particular, the pair of first and second sealing lip members 530, 532 are not damaged or otherwise physical altered as they are inserted during assembly of the rotary seal apparatus 100 of the example embodiment from the position shown in FIG. 5a into the space between the inner and outer sleeve member bodies 122, 142 as shown in FIG. 5b.

As shown in the Figures, the first sealing system body member 510 includes a first circular reinforcement system 540 disposed within the first sealing system body member 510, and the second sealing system body member 520 includes a second circular reinforcement system 550 disposed within the second sealing system body member 520. In the example embodiment, the first circular reinforcement system 540 disposed within the first sealing system body member 510 may include, for example, a resilient first L-shaped member 542 disposed in the first sealing system body member 510 for providing stiffness to the first sealing system body member 510 in axial and radial directions, and a first biasing band member 544 for biasing the first sealing system body member 510 radially inwardly. Similarly in the example embodiment, the second circular reinforcement system 550 disposed within the second sealing system body member 520 may include, for example, a resilient second L-shaped member 552 disposed in the second sealing system body member 520 for providing stiffness to the second sealing system body member 520 in the axial and radial directions, and a second biasing band member 554 for biasing the second sealing system body member 520 radially inwardly. It is to be appreciated that other forms of reinforcement system or structures could equivalently be used as necessary or desired for providing stiffness to the first and second sealing system body members in the axial and radial directions, and for biasing the first and second sealing system body members radially inwardly.

Figure 6A:
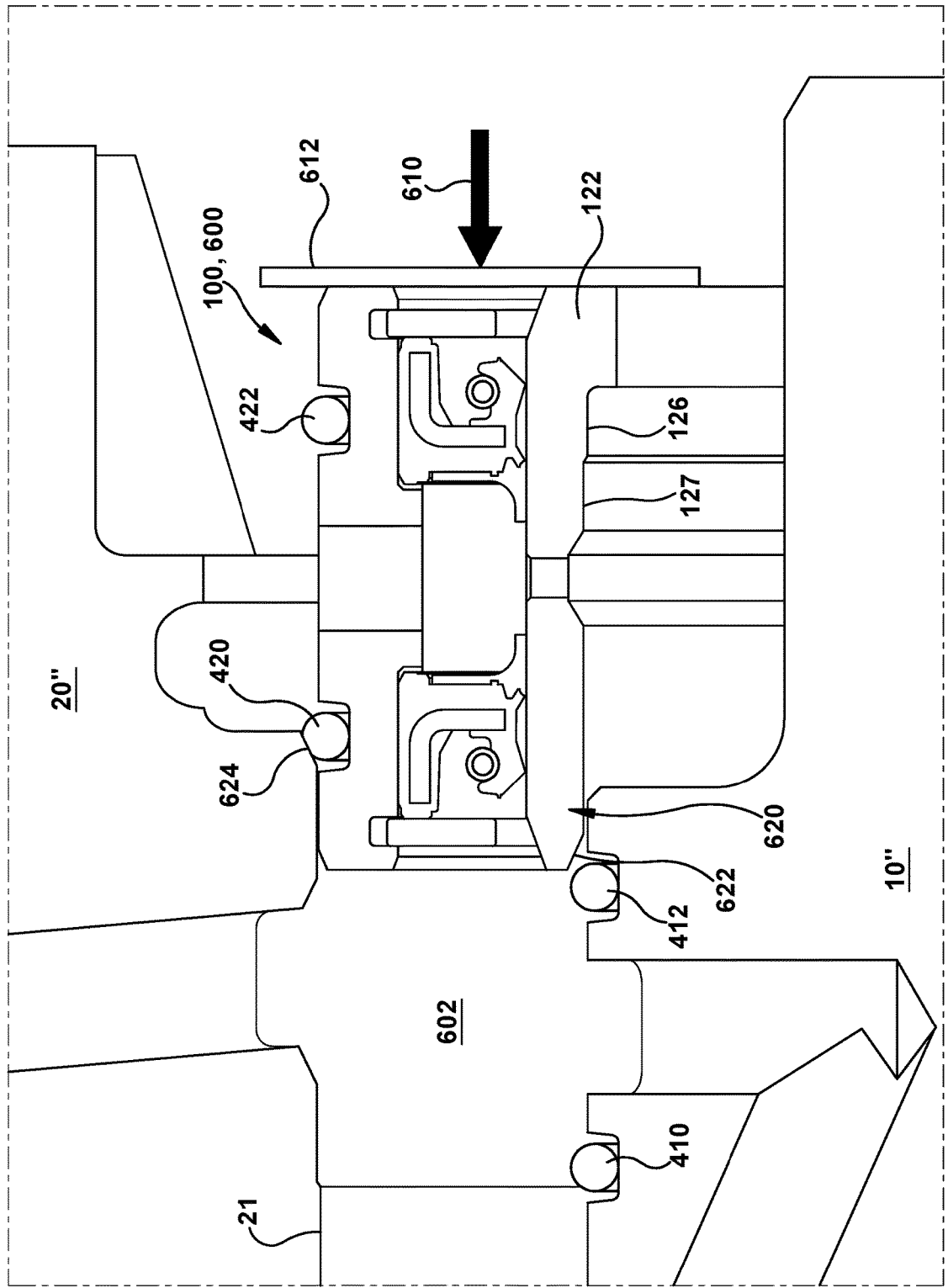
FIGS. 6a-6c illustrate a sequence of steps showing an installation of the assembled rotary seal apparatus of FIGS. 2 and 5b into the components of the work vehicle application of FIG. 4.
Figure 6B:
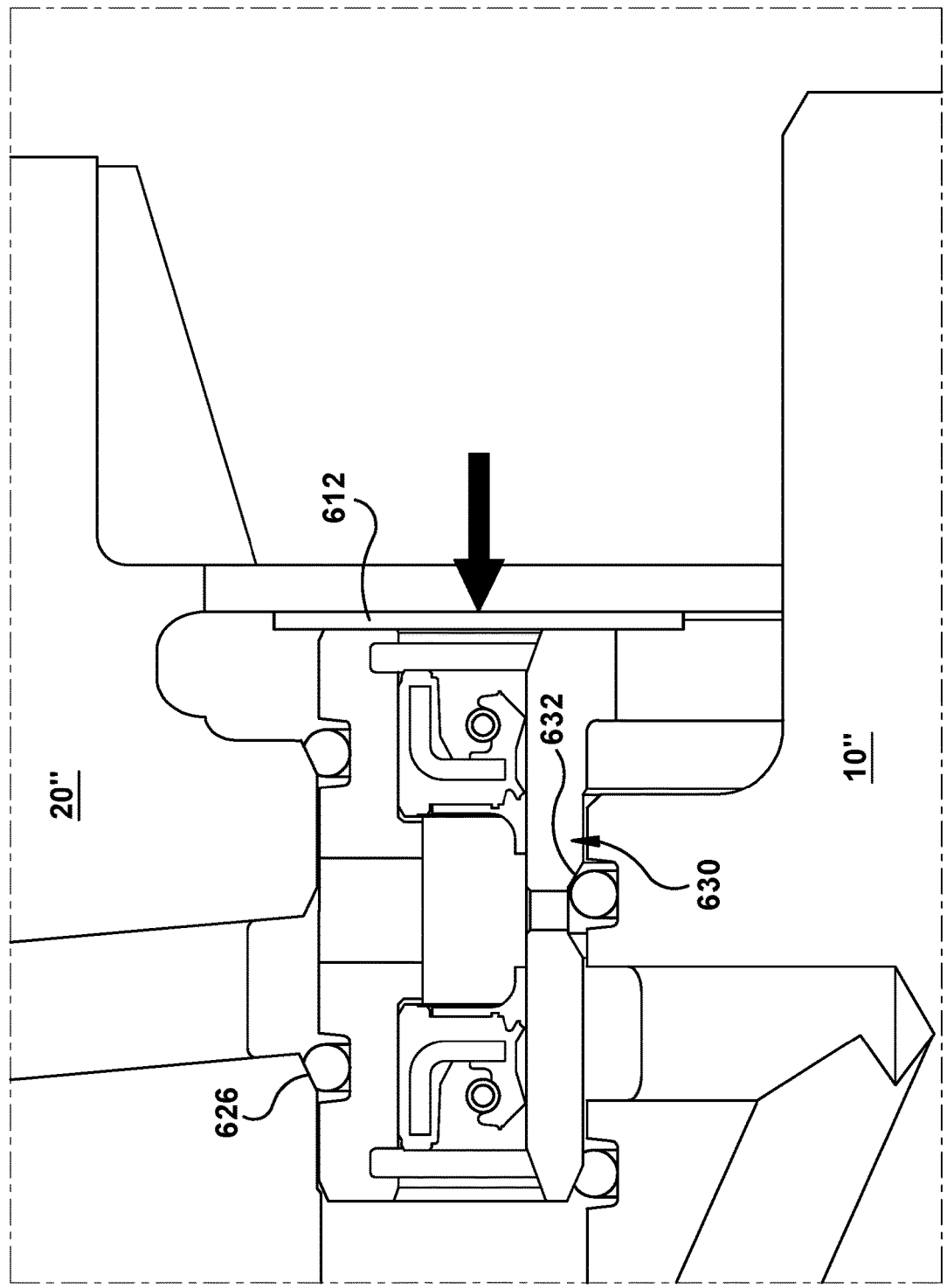
Figure 6C:
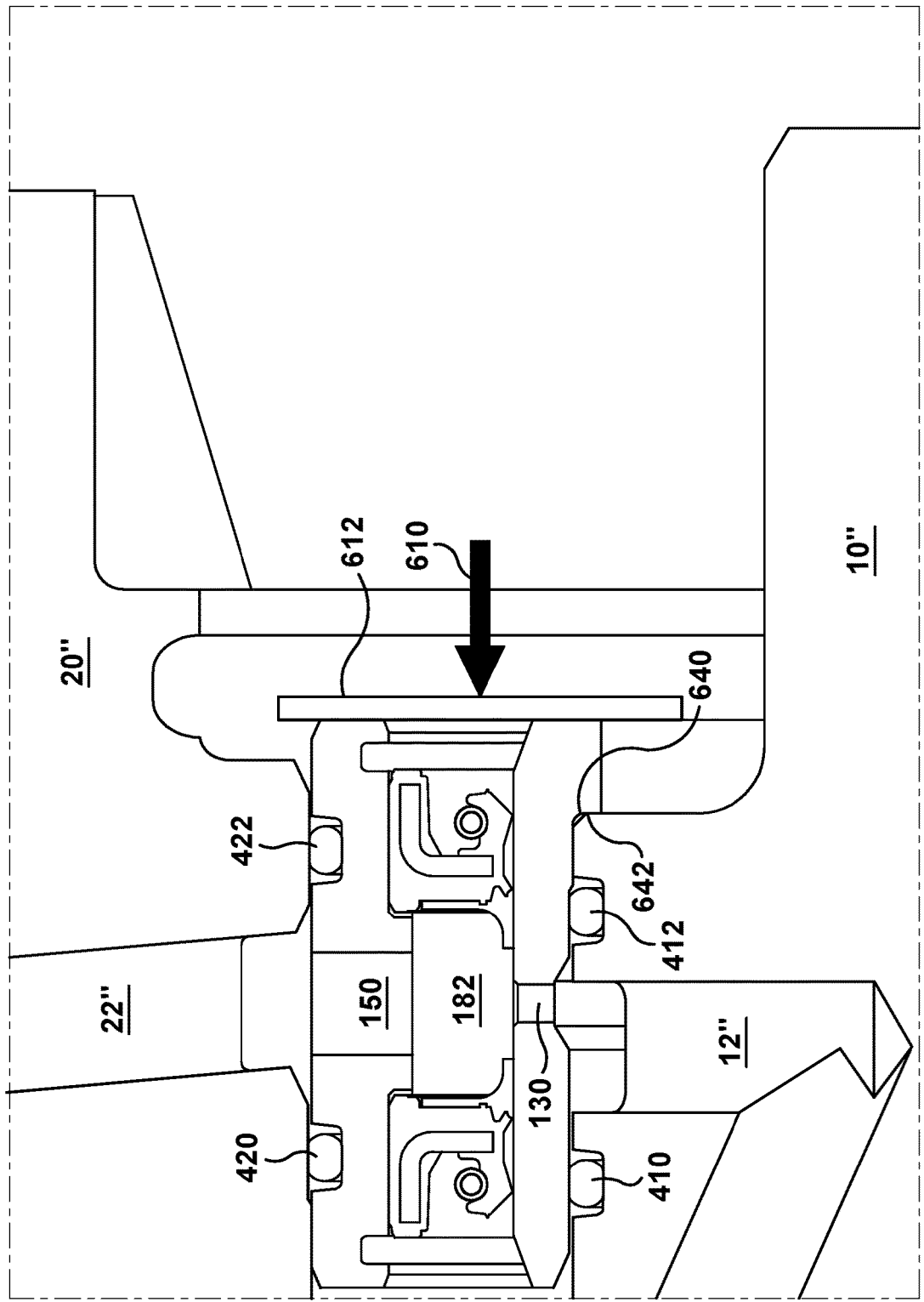

FIGS. 6a-6c illustrate a sequence of steps showing an installation of the assembled rotary seal apparatus of FIGS. 2 and 5b into the components of the work vehicle application of FIG. 4. As described above, the radially inwardly and outwardly directed engagement surfaces 126, 144 of the inner and outer sleeve bodies 122, 142 are each configured for selective engagement with the associated machine components 10", 20" such as by coupling or otherwise press-fitting the sleeve bodies 122, 142 onto the associated machine components 10", 20". In this regard, the fully assembled rotary seal apparatus 100 in accordance with the example embodiment may be inserted into the space or gap between the associated machine components 10", 20". In the example embodiment, the inner and outer sleeve bodies 122, 142 are configured for substantially simultaneously engaging with the associated machine components 10", 20" thereby making installation of the assembled rotary seal apparatus more easily performed. When provided this way, the rotary seal apparatus is not easily damaged during installation. In addition, the rotary seal apparatus of the example embodiments can be made up as a component-level air sealing package such as for example as a cartridge or completed device 600 so that the rotary seal apparatus 100 may be tested for fit and function by skilled technicians under controlled conditions before it is sent to an end user or repair personnel for field installation at the work vehicle such as shown in FIGS. 6a-6c. Such a rotary seal 100 made up as a cartridge or completed device 600 for delivery to the end user as a pre-tested unitary integration of subcomponents as a unitized device requires no further assembly during installation into a work vehicle in the field.

A force 610 may be applied to the rotary seal apparatus 100, 600 using an associated tool 612 for urging the rotary seal apparatus 100, 600 into the gap or space 602 between the first and second associated machine components 10", 20". In the example embodiment illustrated, a lead end 620 of the inner sleeve member 120 is provided with a chamfer or bevel portion 622 for engaging the pair of seal members 410, 412 carried in the pair of circular grooves 14, 16 defined by the first associated machine component 10" and disposed on opposite sides of the first passageway 130. This helps to ensure that the pair of seal members 410, 412 are not damaged or otherwise moved out of position as the rotary seal apparatus 100, 600 is inserted into the associated components. The outer associated machine component 20" may be similarly provided with a chamfer or bevel portion 624 for engaging the pair of seal members 420, 422 carried in the pair of circular grooves 421, 423 defined by the outer sleeve body 142 and disposed on opposite sides of the second passageway 150. This also helps to ensure that the pair of seal members 421, 423 are not damaged or otherwise moved out of position as the rotary seal apparatus 100, 600 is inserted into the associated components.

FIG. 6a shows an initial arrangement of components prior to insertion of the rotary seal apparatus 100, 600 into the associated components and illustrates the chamfer or bevel portion 622 engaging the first seal member 412 of the pair of seal members 410, 412 carried in the pair of circular grooves 14, 16 defined by the first associated machine component 10", and the chamfer or bevel portion 624 engaging the first seal member 420 of the pair of seal members 420, 422 carried in the pair of circular grooves 421, 423 defined by the outer sleeve body 142. As described above, the inner sleeve body 122 further defines a radially inwardly directed guide surface 127 having a slightly larger diameter than the diameter defined by the radially inwardly directed engagement surface 126. In that way, the radially inwardly directed guide surface 127 may help to guide the rotary seal apparatus 100 into the space between the associated first and second machine components 10", 20" until the rotary seal apparatus 100 is nearly fully inserted into place between the first and second machine components 10", 20" during installation of the rotary seal apparatus 100, at which position the radially inwardly directed engagement surface 126 may make contact with a corresponding surface on the associated first machine component 10" for establishing the press fit for frictional attachment of the an inner sleeve body 122 onto the associated first machine component 10". The radially inwardly directed engagement surface 126 of the inner sleeve body 122 is configured for selective engagement with the first associated machine component 10" such as by coupling or otherwise press-fitting the inner sleeve body 122 onto the first associated machine component 10" for frictionally securing the inner sleeve body 122 with the first associated machine component. In addition, the second associated machine component is preferably provided with a reduced diameter portion 21 for engaging the radially outwardly directed engagement surface 144 of the outer sleeve body 142. Preferably, the reduced diameter portion 21 is provided at a location on the second associated machine component so that the reduced diameter portion 21 may make contact with the radially outwardly directed engagement surface 144 substantially simultaneously with the radially inwardly directed engagement surface 126 making contact with the first associated machine component, thereby making installation of the assembled rotary seal apparatus more easily performed. When provided this way, the rotary seal apparatus is not easily damaged during installation.

FIG. 6b shows an arrangement of components approximately midway through the insertion of the rotary seal apparatus 100, 600 into the associated components. In the example embodiment illustrated, a mid-portion 630 of the inner sleeve member 120 is provided with a chamfer or bevel portion 632 near to or otherwise surrounding the first passageway 130 for engaging the second 412 of the pair of seal members 410, 412 carried in the pair of circular grooves 14, 16 defined by the first associated machine component 10" and disposed on opposite sides of the first passageway 130. This helps to ensure that the second 412 of the pair of seal member 412 is not damaged by any possible sharp edges of the first passageway 130 or otherwise moved out of position as the rotary seal apparatus 100, 600 is inserted into the associated components. The outer associated machine component 20" may be similarly provided with a further chamfer or bevel portion 626 for engaging the second seal member 422 of the pair of seal members 420, 422 carried in the pair of circular grooves 421, 423 defined by the outer sleeve body 142 and disposed on opposite sides of the second passageway 150. This also helps to ensure that the seal member 423 is not damaged or otherwise moved out of position as the rotary seal apparatus 100, 600 is inserted into the associated components.

FIG. 6c shows an arrangement of components approximately fully through the insertion of the rotary seal apparatus 100, 600 into the associated components. In the example embodiment illustrated, the inner sleeve body 122 is provided with a stop surface 640 configured to make contact with a corresponding stop surface 642 provided on the first associated component 10". During insertion of the rotary seal apparatus 100, 600 into the associated components under the influence of the tool 612 being motivated by the force 610 the stop surface 640 of the inner sleeve body 122 makes contact with a corresponding stop surface 642 provided on the first associated component 10' whereat the rotary seal apparatus 100, 600 can be inserted no further into the associated components. In this position, the inner sleeve body 122 is press-fitted the onto the first associated machine component 10" and the outer sleeve body 142 is press-fitted into the second associated machine component 20". Further in this position, the pair of seal members 410, 412 comprising O-rings disposed in the pair of circular grooves 14, 16 for provide a fluid tight seal between the inner sleeve member 120 and the first associated machine component 10" so that fluid such as air or the like may be communicated between the first fluid port 12" of the first associated machine component 10" and the first passageway 130 of the inner sleeve body 122 without leakage thereof.

Still further in this position, the pair of seal members 420, 422 comprising O-rings disposed in the pair of circular grooves 421, 423 provide a fluid tight seal between the outer sleeve member 140 and the second associated machine component 20" so that fluid such as air or the like may be communicated between the second fluid port 22" of the second associated machine component 20" and the second passageway 150 of the outer sleeve body 142 without leakage thereof.

Yet still further in this position, the first and second fluid ports 12", 22" of the first and second machine components are in fluid communication with the first and second passageways 130, 150 of the inner and outer sleeve bodies, which as in turn in operative fluid communication with the annular fluid channel 182 of the chamber 180 defined by the sealing system 160.

Figure 7:
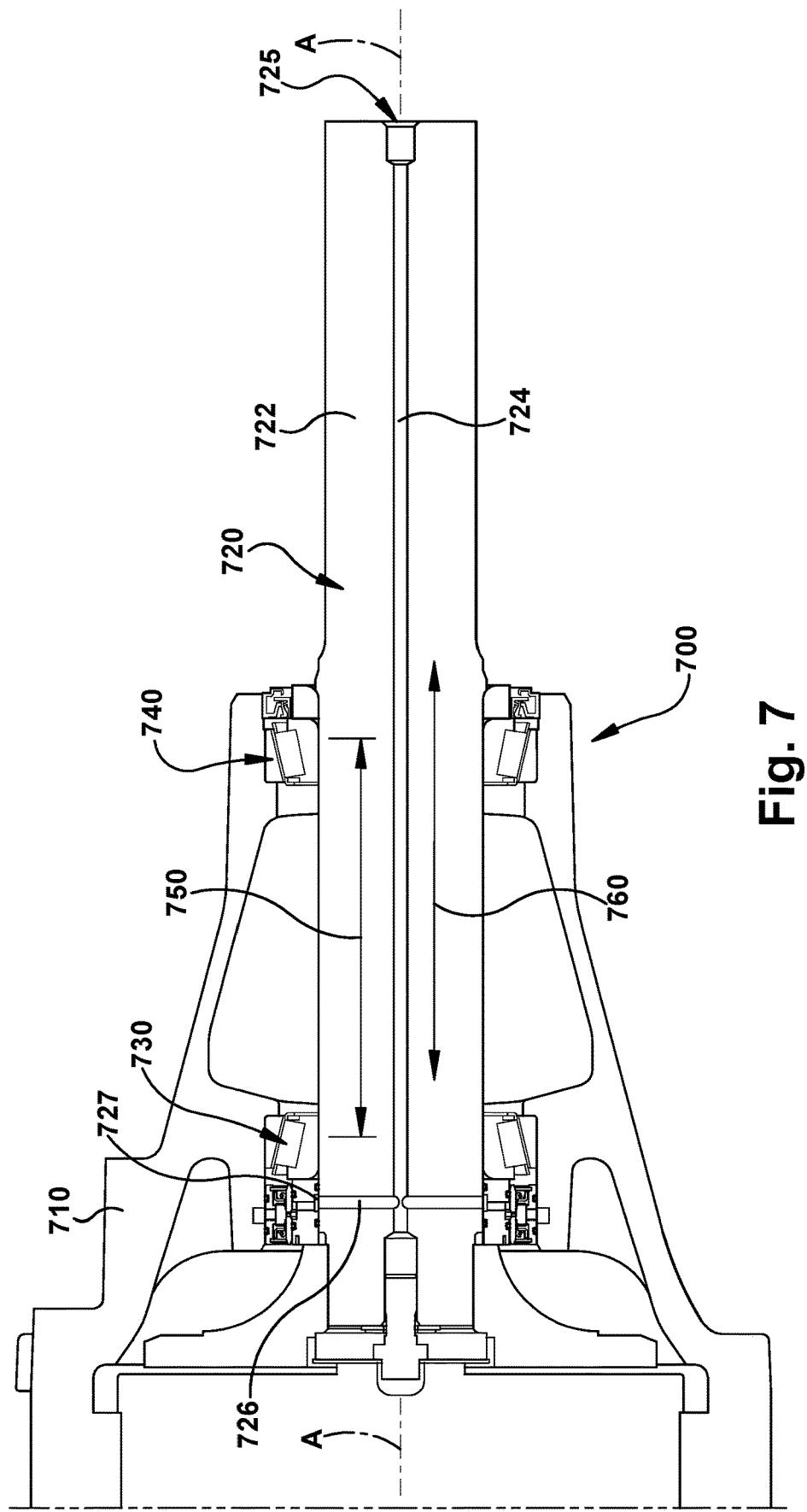
FIG. 7 is a cross-sectional view showing an arrangement of the rotary seal apparatus of the example embodiments in an axle support system of an associated work vehicle in accordance with an example embodiment.

FIG. 7 is a cross-sectional view showing an arrangement or system 700 of the rotary seal apparatus 100 of the example embodiments disposed in an axle support system such as a housing member 710 of an associated work vehicle in accordance with a further example embodiment. In the example embodiment shown in FIG. 7, the rotary union 100 is provided at a position inboard of the primary axle shaft supports relative to a wheel that may be attached with the axle shaft outboard of the primary axle shaft supports, thereby enabling axle shaft air passage features to be located outside of any areas of higher stress flow that may be generated from ground engaging bending loads of the axle during use of the associated work vehicle.

As shown in FIG. 7, the system includes an elongate axle 720 carried for rotation about a rotation axis A relative to a housing member 710 of the associated work vehicle on axially spaced apart first and second bearings 730, 740 of the associated work vehicle, and a rotary seal apparatus 100 of the type described above for communicating a working fluid between the axle 720 and the housing member 710 of the associated work vehicle.

In accordance with the example embodiment, the elongate axle 720 includes an axle body 722 defining an axial passageway 724 extending within the axle body 722 along a first portion 750 of the axle 720 between the axially spaced apart first and second bearings 730, 740 in a first direction 760 substantially in parallel with the rotation axis A of the axle 720. The axial passageway 724 defines an outer port 725 opening outside of the housing member 710.

The axle body 722 of the elongate axle 720 further defines a radial passageway 726 extending within the axle body 722 outside of the first portion 750 of the axle between the axially spaced apart first and second bearings 730, 740 in a second direction 762 substantially perpendicular to the rotation axis A of the axle 720. The radial passageway 726 defines an inner port 727 opening inside of the housing member 710.

In accordance with the example embodiment, the axial and radial passageways are in fluid communication with each other. Further in accordance with the example embodiment, and with reference to FIG. 7 together with FIGS. 2 and 4, the rotary seal apparatus 100 includes an annular inner sleeve member 120 comprising an inner sleeve body 122 having opposite radially outwardly directed and radially inwardly directed engagement surfaces 124, 126, an annular outer sleeve member 140 comprising an outer sleeve body 142 having opposite radially outwardly directed and radially inwardly directed engagement surfaces 144, 146, and a sealing system 160 disposed between the inner and outer sleeve members 120, 140. The radially inwardly directed engagement surface 126 of the inner sleeve body 122 is configured for selective engagement with the axle 720 and defines a first passageway 130 extending through the inner sleeve body 122 between the opposite radially outwardly and radially inwardly directed engagement surfaces 124, 126 of the inner sleeve body 122. The first passageway 130 is in operative fluid communication with the radial passageway 726 of the axle body 722 when the radially inwardly directed engagement surface 126 of the inner sleeve body 122 is selectively engaged with the axle body 722.

Similarly, the radially outwardly directed engagement surface 144 of the outer sleeve body 142 is configured for selective engagement with the housing member 710 of the associated work vehicle. The outer sleeve member 140 defines a second passageway 150 extending through the outer sleeve body 142 between the opposite radially outwardly and radially inwardly directed engagement surfaces 144, 146 of the outer sleeve body 142. The second passageway 150 is in operative fluid communication with a housing fluid port 22''' of the housing member 710 of the associated work vehicle when the radially outwardly directed engagement surface 144 of the outer sleeve body 142 is selectively engaged with the housing member 710.

The sealing system 160 of the example embodiment includes an attachment portion 162 attached with a one of the inner sleeve body 122 or the outer sleeve body 142, and an engagement portion 164 slidably engaged with the other of the inner sleeve body 122 or the outer sleeve body 142. The sealing system 160 disposed between the inner and the outer sleeve members 120, 140 forms a fluid chamber 180 between the inner and the outer sleeve bodies 122, 142, wherein the fluid chamber 180 defines an annular fluid channel 182 operable to communicate the working fluid between the radial passageway 726 of the axle body 722 via the first passageway 130 of the inner sleeve member 120 and the housing fluid port 22''' of the housing member 710 of the associated work vehicle via the second passageway 150 of the outer sleeve member 140.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A rotary seal apparatus for communicating a working fluid between first and second associated machine components that are rotatable relative to each other about a rotation axis A extending through the first and second associated machine components, wherein the first associated machine component is located in the second associated machine component, the rotary seal apparatus comprising:
   an annular inner sleeve member comprising an inner sleeve body having opposite radially outwardly directed and radially inwardly directed engagement surfaces, the radially inwardly directed engagement surface of the inner sleeve body being configured for selective engagement with the first associated machine component, the inner sleeve member defining a first passageway extending through the inner sleeve body between the opposite radially outwardly and radially inwardly directed engagement surfaces of the inner sleeve body, the first passageway being in operative fluid communication with a first fluid port of the first associated machine component when the radially inwardly directed engagement surface of the inner sleeve body is selectively engaged with the first associated machine component;
   an annular outer sleeve member comprising an outer sleeve body having opposite radially outwardly directed and radially inwardly directed engagement surfaces, the radially outwardly directed engagement surface of the outer sleeve body being configured for selective engagement with the second associated machine component, the outer sleeve member defining a second passageway extending through the outer sleeve body between the opposite radially outwardly and radially inwardly directed engagement surfaces of the outer sleeve body, the second passageway being in operative fluid communication with a second fluid port of the second associated machine component when the radially outwardly directed engagement surface of the outer sleeve body is selectively engaged with the second associated machine component; and
   a sealing system disposed between the inner and outer sleeve members, the sealing system comprising:
   an attachment portion disposed between axially spaced apart portions of an attachment portion of a one of the inner sleeve body or the outer sleeve body, wherein at least one of the axially spaced apart portions is selectively removable; and
   an engagement portion slidably engaged with the other of the inner sleeve body or the outer sleeve body, the sealing system disposed between the inner and the outer sleeve members forming a fluid chamber between the inner and the outer sleeve bodies, the fluid chamber defining an annular fluid channel operable to communicate the working fluid between the first fluid port of the first associated machine component via the first passageway of the inner sleeve member and the second fluid port of the second associated machine component via the second passageway of the outer sleeve member.

2. The rotary seal apparatus according to claim 1, wherein:
   the attachment portion of the one of the inner sleeve body or the outer sleeve body is defined by the inner sleeve body for movement of the sealing system and the inner sleeve body together with the first associated machine component;
   the engagement portion of the sealing system comprises axially spaced apart first and second sealing member portions defining the fluid chamber of the sealing system therebetween;
   the first and second sealing member portions of the sealing system are disposed on opposite sides of the second passageway defined by the outer sleeve body of the outer sleeve member; and
   the radially inwardly directed engagement surface of the outer sleeve body comprises a radially inwardly directed wear surface, configured to slidably engage the first and second sealing member portions when the first and second associated machine components are rotatable relative to each other about the rotation axis (A') extending through the first and second associated machine components.

3. The rotary seal apparatus according to claim 1, wherein:
the attachment portion of the one of the inner sleeve body or the outer sleeve body is defined by the outer sleeve body for movement of the sealing system and the outer sleeve body together with the second associated machine component;
the engagement portion of the sealing system comprises first and second sealing member portions defining the fluid chamber of the sealing system therebetween;
the first and second sealing member portions of the sealing system are disposed on opposite sides of the first passageway defined by the inner sleeve body of the inner sleeve member; and
the radially outwardly directed engagement surface of the inner sleeve body comprises a radially outwardly directed wear surface configured to slidably engage the first and second sealing members when the first and second associated machine components are rotatable relative to each other about the rotation axis A extending through the first and second associated machine components.

4. The rotary seal apparatus according to claim 3, wherein:
the first sealing member portion comprises a first sealing lip member extending in a first direction along the rotation axis towards the first passageway defined by the inner sleeve body of the inner sleeve member, the first sealing lip member being configured to slidably engage the radially outwardly directed wear surface of the inner sleeve body on a first side of the first passageway defined by the inner sleeve body of the inner sleeve member under an influence of a pressure of the fluid within the annular fluid channel; and
the second sealing member portion comprises a second sealing lip member extending in a second direction opposite the first direction along the rotation axis towards the first passageway defined by the inner sleeve body of the inner sleeve member, the second sealing lip member being configured to slidably engage the radially outwardly directed wear surface of the inner sleeve body on a second side of the first passageway defined by the inner sleeve body of the inner sleeve member under the influence of the pressure of the fluid within the annular fluid channel.

5. The rotary seal apparatus according to claim 3, wherein:
the sealing system comprises separate axially spaced apart first and second sealing system body members;
the first sealing system body member carries the first sealing member portion comprising a first sealing lip member extending in a first direction along the rotation axis towards the first passageway defined by the inner sleeve body of the inner sleeve member, the first sealing lip member being configured to slidably engage the radially outwardly directed wear surface of the inner sleeve body on a first side of the first passageway defined by the inner sleeve body of the inner sleeve member under an influence of a pressure of the fluid within the annular fluid channel; and
the second sealing system body member carries the second sealing member portion comprising a second sealing lip member extending in a second direction opposite the first direction along the rotation axis towards the first passageway defined by the inner sleeve body of the inner sleeve member, the second sealing lip member being configured to slidably engage the radially outwardly directed wear surface of the inner sleeve body on a second side of the first passageway defined by the inner sleeve body of the inner sleeve member under the influence of the pressure of the fluid within the annular fluid channel.

6. The rotary seal apparatus according to claim 1, wherein the annular outer sleeve member is symmetrical.

7. The rotary seal apparatus according to claim 1, wherein:
the radially inwardly directed engagement surface of the inner sleeve body defines a first diameter; and
the inner sleeve body defines a radially inwardly directed guide surface having a second diameter, wherein the second diameter is larger than the first diameter.

8. The rotary seal apparatus according to claim 1, wherein: the axially spaced apart portions of the attachment portion of the one of the inner sleeve body or the outer sleeve body comprise: first and second members carried in axially spaced apart grooves defined in the one of the inner sleeve body or the outer sleeve body, wherein the first and second members are selectively removable from the axially spaced apart grooves.

9. The rotary seal apparatus according to claim 8, wherein:
the attachment portion of the one of the inner sleeve body or the outer sleeve body comprises a one of:
first and second abutment surfaces defined by radially inwardly directed engagement surfaces of the outer sleeve member, or
first and second abutment surfaces defined by radially outwardly directed engagement surfaces of the inner sleeve member.

10. The rotary seal apparatus according to claim 9, wherein:
the attachment portion of the sealing system is disposed between the first and second abutment surfaces and the first and second members.

11. The rotary seal apparatus according to claim 10, wherein:
the attachment portion of the sealing system is held in place between the first and second abutment surfaces and the first and second members.

12. A system for communicating a working fluid between components of an associated work vehicle, the system comprising:
a housing member;
an elongate axle carried for rotation about a rotation axis A relative to the housing member of the associated work vehicle on axially spaced apart first and second bearings of the associated work vehicle, the elongate axle comprising an axle body defining:
an axial passageway extending within the axle body along a first portion of the axle between the axially spaced apart first and second bearings in a first direction substantially in parallel with the rotation axis (A), the axial passageway comprising an outer port opening outside of the housing member; and
a radial passageway in fluid communication with the axial passageway, the radial passageway extending within the axle body outside of the first portion of the axle in a second direction substantially perpendicular to the rotation axis (A), the radial passageway comprising an inner port opening inside of the housing member; and a rotary seal apparatus for communicating the working fluid between the axle and the housing member of the associated work vehicle, the rotary seal apparatus comprising:

an annular inner sleeve member comprising an inner sleeve body having opposite radially outwardly directed and radially inwardly directed engagement surfaces, the radially inwardly directed engagement surface of the inner sleeve body being configured for selective engagement with the axle, the inner sleeve member defining a first passageway extending through the inner sleeve body between the opposite radially outwardly and radially inwardly directed engagement surfaces of the inner sleeve body, the first passageway being in operative fluid communication with the radial passageway of the axle when the radially inwardly directed engagement surface of the inner sleeve body is selectively engaged with the axle body; and an annular outer sleeve member comprising an outer sleeve body having opposite radially outwardly directed and radially inwardly directed engagement surfaces, the radially outwardly directed engagement surface of the outer sleeve body being configured for selective engagement with the housing member of the associated work vehicle, the outer sleeve member defining a second passageway extending through the outer sleeve body between the opposite radially outwardly and radially inwardly directed engagement surfaces of the outer sleeve body, the second passageway being in operative fluid communication with a housing fluid port of the housing member of the associated work vehicle when the radially outwardly directed engagement surface of the outer sleeve body is selectively engaged with the housing member; and a sealing system disposed between the inner and outer sleeve members, the sealing system comprising:

an attachment portion disposed between axially spaced apart portions of an attachment portion of a one of the inner sleeve body or the outer sleeve body, wherein at least one of the axially spaced apart portions is selectively removable, and an engagement portion slidably engaged with the other of the inner sleeve body or the outer sleeve body, the sealing system disposed between the inner and the outer sleeve members forming a fluid chamber between the inner and the outer sleeve bodies, the fluid chamber defining an annular fluid channel operable to communicate the working fluid between the radial passageway of the axle body via the first passageway of the inner sleeve member and the housing fluid port of the housing member of the associated work vehicle via the second passageway of the outer sleeve member.

13. The system according to claim 12, wherein:

the attachment portion of the one of the inner sleeve body or the outer sleeve body is defined by the inner sleeve body for movement of the sealing system and the inner sleeve body together with the first associated machine component;

the engagement portion of the sealing system comprises axially spaced apart first and second sealing member portions defining the fluid chamber of the sealing system therebetween;

the first and second sealing member portions of the sealing system are disposed on opposite sides of the second passageway defined by the outer sleeve body of the outer sleeve member; and the radially inwardly directed engagement surface of the outer sleeve body comprises a radially inwardly directed wear surface, configured to slidably engage the first and second sealing member portions when the axle and the housing member are rotatable relative to each other about the rotation axis (A') extending through the first and second associated machine components.

14. The system according to claim 12, wherein:

the attachment portion of the one of the inner sleeve body or the outer sleeve body is defined by the outer sleeve body for movement of the sealing system and the outer sleeve body together with the housing member;

the engagement portion of the sealing system comprises first and second sealing member portions defining the fluid chamber of the sealing system therebetween;

the first and second sealing member portions of the sealing system are disposed on opposite sides of the first passageway defined by the inner sleeve body of the inner sleeve member; and the radially outwardly directed engagement surface of the inner sleeve body comprises a radially outwardly directed wear surface configured to slidably engage the first and second sealing members when the axle and the housing member are rotatable relative to each other about the rotation axis (A) extending through the axle and the housing member.

15. The system according to claim 14, wherein:

the first sealing member portion comprises a first sealing lip member extending in a first direction along the rotation axis towards the first passageway defined by the inner sleeve body of the inner sleeve member, the first sealing lip member being configured to slidably engage the radially outwardly directed wear surface of the inner sleeve body on a first side of the first passageway defined by the inner sleeve body of the inner sleeve member under an influence of a pressure of the fluid within the annular fluid channel; and the second sealing member portion comprises a second sealing lip member extending in a second direction opposite the first direction along the rotation axis towards the first passageway defined by the inner sleeve body of the inner sleeve member, the second sealing lip member being configured to slidably engage the radially outwardly directed wear surface of the inner sleeve body on a second side of the first passageway defined by the inner sleeve body of the inner sleeve member under the influence of the pressure of the fluid within the annular fluid channel.

16. The system according to claim 14, wherein:

the sealing system comprises separate axially spaced apart first and second sealing system body members;

the first sealing system body member carries the first sealing member portion comprising a first sealing lip member extending in a first direction along the rotation axis towards the first passageway defined by the inner sleeve body of the inner sleeve member, the first sealing lip member being configured to slidably engage the radially outwardly directed wear surface of the inner sleeve body on a first side of the first passageway defined by the inner sleeve body of the inner sleeve member under an influence of a pressure of the fluid within the annular fluid channel; and the second sealing system body member carries the second sealing member portion comprising a second sealing lip member extending in a second direction opposite the first direction along the rotation axis towards the first passageway defined by the inner sleeve body of the inner sleeve member, the second sealing lip member being configured to slidably engage the radially outwardly directed wear surface of the inner sleeve body on a second side of the first passageway defined by the inner sleeve body of the inner sleeve member under the influence of the pressure of the fluid within the annular fluid channel.

17. The system according to claim 12, wherein the annular outer sleeve member of the rotary seal apparatus is symmetrical.

18. The system according to claim 12, wherein:
the radially inwardly directed engagement surface of the inner sleeve body of the rotary seal apparatus defines a first diameter; and
the inner sleeve body of the rotary seal apparatus defines a radially inwardly directed guide surface having a second diameter, wherein the second diameter is larger than the first diameter.

19. The system according to claim 12, wherein: the axially spaced apart portions of the attachment portion of the one of the inner sleeve body or the outer sleeve body comprise:

first and second members carried in axially spaced apart grooves defined in the one of the inner sleeve body or the outer sleeve body, wherein the first and second members are selectively removable from the axially spaced apart grooves; and the attachment portion of the one of the inner sleeve body or the outer sleeve body comprises a one of:

first and second abutment surfaces defined by radially inwardly directed engagement surfaces of the outer sleeve member, or first and second abutment surfaces defined by radially outwardly directed engagement surfaces of the inner sleeve member.

20. The system according to claim 19, wherein:

the attachment portion of the sealing system is held in place between the first and second abutment surfaces and the first and second members.

* * * * *